United States Patent Office 3,473,389
Patented Oct. 21, 1969

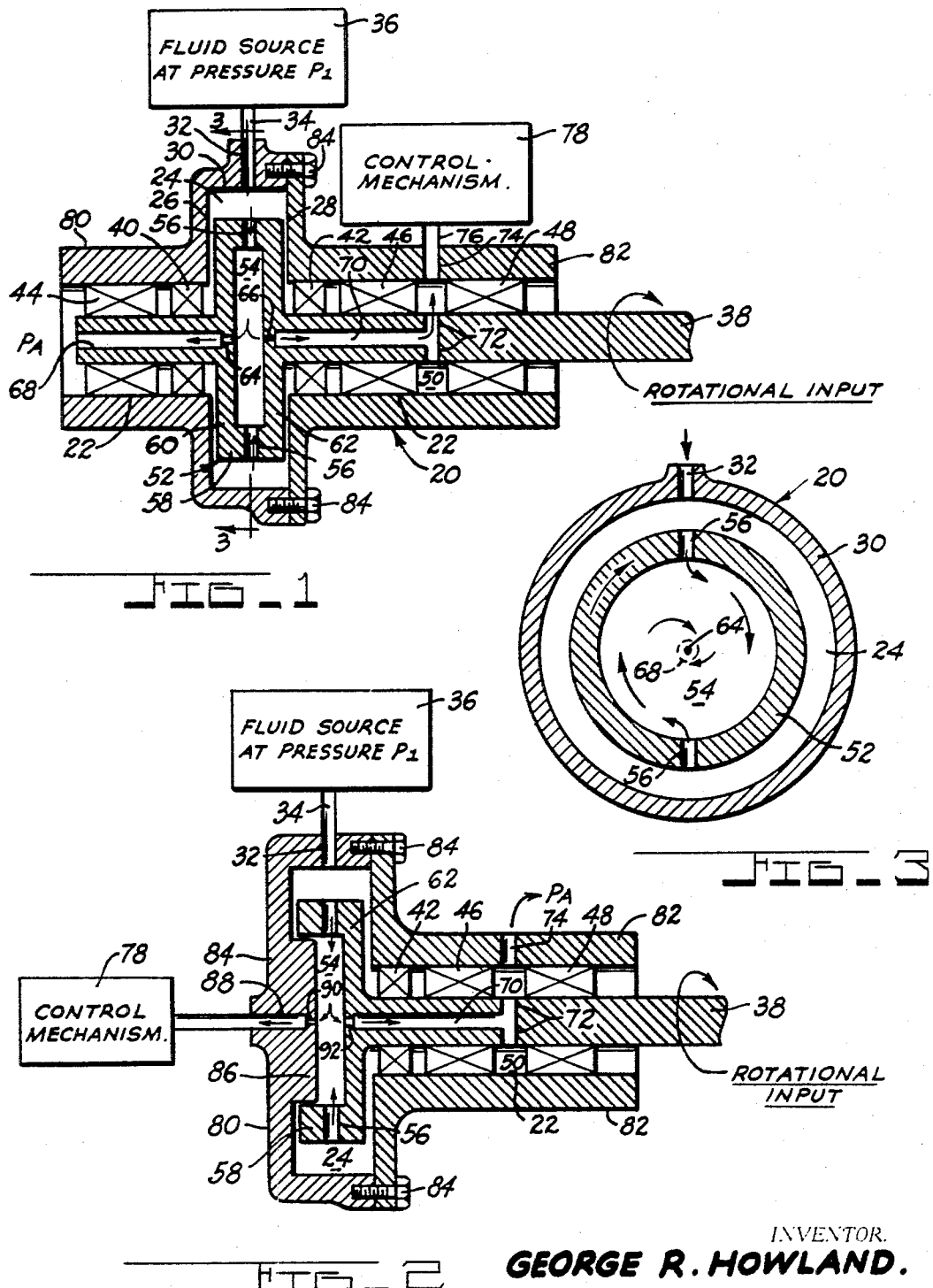

3,473,389
FLUIDIC VELOCITY SENSOR
George R. Howland, South Bend, Ind., assignor to The Bendix Corporation, a corporation of Delaware
Filed Sept. 25, 1967, Ser. No. 670,192
Int. Cl. G01p 3/26
U.S. Cl. 73—521                                     10 Claims

ABSTRACT OF THE DISCLOSURE

A velocity sensor of the fluidic type having a fluid transmitting conduit containing a rotatably mounted chamber provided with inlet means and outlet means spaced radially inwardly from the inlet. The rotatable chamber is driven at a variable speed as a function of a variable input condition such as engine speed and depending upon the speed of rotation causes fluid flow passing from the inlet to the outlet to assume a corresponding vortex flow pattern which acts as an impedance to fluid flow therethrough. The fluid pressure at the outlet is sensed to provide an output pressure signal which varies as a function of the speed of rotation of the driven chamber.

BACKGROUND OF THE INVENTION

The subject invention relates to a fluidic device wherein a fluid vortex generated in a chamber as a function of a variable input condition establishes a variable impedance to fluid flow through the chamber which variation in fluid flow may be sensed thereby providing an output signal representative of the input condition. The present fluidic velocity sensor is an improvement of the velocity sensor shown and described in U.S. patent application Ser. No. 414,088 filed Nov. 27, 1964, in the name of George R. Howland and Charles N. High and having a common assignee, now Patent No. 3,347,103. It has been found that the present fluidic velocity sensor is more sensitive to variations in the input condition and operable over a wider range of supply fluid pressure levels compared to the sensor of application Ser. No. 414,088.

Conventional velocity sensors of the type that measure rotational velocity of an engine or other variable speed devices, for instance, require mechanical and/or electrical components suitably integrated to convert a sensed rotational velocity of a shaft or the like to a suitable output signal which varies as a function of the sensed rotational velocity and which is satisfactory for control purposes. Such mechanical and/or electrical apparatus becomes relatively complex resulting in a corresponding bulky and/ or weighty as well as expensive mechanism which is subject to deterioration due to frictional wear of mechanical parts and failure of electrical components such that maintenance, reliability and accuracy become a problem particularly under adverse environmental conditions.

SUMMARY OF THE INVENTION

The present fluidic velocity sensor, with the exception of a rotatable input member, requires no moving mechanical parts or electrical components to convert a variable input velocity condition to a corresponding variable output fluid pressure condition.

It is an object of the present invention to provide a relatively simple, lightweight and compact velocity sensing device wherein a rotational input velocity is converted to a corresponding variable output fluid pressure signal.

It is another object of the present invention to provide a fluidic velocity sensor which is reliable, accurate and capable of sustaining operation with a minimum of maintenance.

BRIEF DESCRIPTION OF THE DRAWING

FIGURE 1 is a schematic representation in section of the present fluidic velocity sensor.

FIGURE 2 is a schematic representation in section of a modified form of the present fluidic velocity sensor.

FIGURE 3 is a cross section taken on line 3—3 of FIGURE 1.

DESCRIPTION OF THE PREFERRED EMBODIMENTS

Referring to FIGURE 1, numeral 20 designates a casing having a bore 22 extending therethrough. The bore 22 is provided with an enlarged diameter portion defining a circular chamber 24 having spaced apart walls 26 and 28 and an annular wall portion 30 connecting the same. An inlet port 32 in wall portion 30 communicates with chamber 24 and a supply fluid passage 34 connected to a source of pressurized fluid 36 at pressure $P_1$ which is preferably maintained constant.

A shaft 38 which, for instance, may be connected to the crankshaft of an engine, not shown, the speed of which is desired to be measured, is rotatably carried in bore 22 on conventional spaced apart ball thrust bearings 40 and 42 suitably secured in position in bore 22 by conventional means such as a press fit. Conventional journal pressure seal bearings 44 and 46 slidably receive shaft 38 and are suitably secured in position in bore 22 between bearings 40 and 42, respectively, and the respective adjacent ends of casing 20 to provide a seal against fluid flow between the surfaces of bore 22 and shaft 38. The shaft 38 is also slidably carried in a conventional journal pressure seal bearing 48 suitably secured in bore 22 and spaced from bearing 46 to define an annular space 50.

The shaft 38 is provided with an enlarged diameter portion 52 within which is formed a circular chamber 54 concentric therewith. One or more inlet passages 56 in the radially outermost wall portion 58 of portion 52 extend radially therethrough and communicate chamber 24 with chamber 54.

Axially spaced apart walls 60 and 62 of chamber 54 connected by wall 58 are provided with restricted ports 64 and 66, respectively, which are aligned on the axis of shaft 38. An axial passage 68 through shaft 38 connects port 64 with a suitable relatively low pressure fluid source, as for instance, the atmosphere at pressure $P_A$. The effective flow area of port 64 is relatively small compared to the flow area defined by inlet passages 56 and therefore presents the major restriction to fluid flow through chamber 54 such that the fluid pressure upstream from port 64 is maintained at pressure $P_1$ with shaft 38 fixed in position. However, with shaft 38 rotating, the fluid pressure in chamber 54 will vary between pressures $P_1$ and $P_A$ depending upon the speed of rotation of shaft 38 as will be described hereinafter. An axial passage 70 in shaft 38 connects port 66 with radial passages 72 which, in turn, communicate with annular space 50. A port 74 in casing 20 communicates annular space 50 with a passage 76 leading to a conventional fluid pressure responsive control mechanism 78 adapted to respond to the fluid at pressure $P_1$ communicated thereto and provide an output control function in response to the pressure $P_1$.

The casing 20 may be made in two sections 80 and 82 and suitably secured together by bolts 84 to facilitate assembly and disassembly of the sensor structure.

For the purpose of the following description of FIGURE 1, it will be assumed that the fluid source 36 is pressurized air. However, it will be understood that other compressible gases or incompressible liquids may be substituted for pressurized air if desired.

Assuming the input rotational velocity to be zero, the shaft 38 will remain stationary. Fluid at pressure $P_1$ will pass through port 32 in chamber 24 from which it flows through inlet passages 56 and radially into chamber 54 then out of port 62 and passage 68 to the atmosphere at pressure $P_A$.

The port 66 may be of relatively small flow area to provide a limited fluid flow at pressure $P_1$ to control mechanism 78 as will be understood by those persons skilled in the art. The pressure $P_1$ communicated to control mechanism 78 provides a pressure indicative of stationary shaft 38.

Now, assuming the shaft 38 to start rotating in either direction in response to a rotational input applied thereto, the fluid passing through inlet passage 56 will assume a tangential velocity of a magnitude dependent upon the rotational velocity of shaft 38 which causes the fluid passing through circular chamber 54 to follow a spiral vortex path in passing from inlet passages 56 to outlet port 64. As the flow approaches outlet port 64, the tangential velocity of a given particle of air increases significantly by virtue of the well known conservation of angular momentum resulting in a corresponding drop in pressure $P_1$ to static fluid pressure $P_S$ at the ports 64 and 66 which are collinear with the axis of rotation of chamber 54 and thus the center of the vortex flow. The static pressure $P_S$ thus generated varies between pressure $P_1$ and $P_A$ depending upon the speed of rotation of chamber 54 with pressure $P_S$ approaching $P_A$ as the speed of rotation increases. A relatively small amount of the fluid flow passing through chamber 54 will exit at pressure $P_S$ via port 66 to control mechanism 78 which, in turn, responds to pressure $P_S$ thus providing an output signal which varies as a function of the input rotational velocity to shaft 38.

If desired, the control mechanism 78 may be adapted to supply a suitably pressurized fluid to port 66 and respond to the resulting flow variations therethrough to chamber 54 which will vary in response to static pressure $P_S$ as an inverse function of the rotational velocity of shaft 38.

In the event that a high power ouput fluid flow is required for the control mechanism, the outlet passage 68 as well as port 66 may be connected to passage 70 thereby transmitting all of the output flow from chamber 54 to control mechanism 78.

Referring to FIGURE 2, the embodiment of the present invention shown therein is particularly adapted for use where the end of the engine shaft or other similar rotatable member, the speed of which is to be measured, is easily accessible. Elements in FIGURE 2 corresponding to like elements of FIGURE 1 are identified by similar numerals. It will be assumed that shaft 38 is an integral end portion of a rotatable engine shaft or the like.

In FIGURE 2, the chamber 54 is partially defined by a fixed wall portion 84 formed on casing 80 which is provided with a boss 86 aligned with the axis of rotation of shaft 38. The wall portion 58 extends axially from wall 62 into overlapping relatively close sliding engagement with boss 86 thereby providing a substantially fluid tight seal between rotatable wall portion 58 and fixed boss 86. The wall portion 84 is provided with an axial passage 88 and a port 90 in series therewith which communicates chamber 54 with the control mechanism 78.

A port 92 in wall 62 is aligned with port 90 and communicates chamber 54 with passage 70 which leads to the relatively low pressure source at pressure $P_A$ via passages 72, annulus 50 and port 74. It will be understood that port 90 is relatively small in comparison to port 92 for the same reason as port 66 relative to port 64 in FIGURE 1.

It will be assumed, as in the case of FIGURE 1, that pressurized air at pressure $P_1$ supplied to chamber 24. With shaft 38 stationary, air at pressure $P_1$ will pass through inlet passage 56 from chamber 24 to chamber 54 and then to ports 90 and 66 without undergoing a pressure drop. The air at pressure $P_1$ in chamber 54 then exits through port 92, passages 70 and 72, annulus 50 and port 74 to the atmosphere at pressure $P_A$. The relatively small amount of air at pressure $P_1$ passing through port 90 and passage 88 to control mechanism 78 provides a pressure indication thereto indicative of the stationary shaft 38.

Assuming the shaft 38 to start rotating in either direction, the air at pressure $P_1$ entering chamber 54 will have a tangential velocity imposed thereon, as in the case of FIGURE 1, thereby generating a spiral vortex. As the air spirals radially inwardly through chamber 54 to ports 90 and 92, the tangential velocity of a given particle of air increases, as in the case of FIGURE 1, resulting in a corresponding drop in pressure $P_1$ to static pressure $P_S$ at outlet ports 90 and 92 depending upon the rotational velocity of shaft 38. The pressure $P_S$ transmitted to control mechanism 78 via port 90 and passage 88 provides an input signal thereto representative to the rotational velocity of shaft 38.

It will be recognized that the venting arrangement of FIGURE 2 whereby the static pressure $P_S$ is vented through the fixed wall 84 eliminates possible bearing leakage problems which could occur by venting the static pressure $P_S$ through annulus 50 defined by bearings 46 and 48 as in FIGURE 1.

It will be understood that various changes and modifications in the above described embodiments may be made without departing from the scope of applicant's invention as defined by the following claims.

I claim:

1. A fluidic velocity sensor for measuring the velocity of a rotatable member comprising:
   a source of pressurized fluid;
   casing means defining a first chamber connected to receive pressurized fluid from said source;
   rotatable means defining a second chamber mounted for rotation in said first chamber about an axis and connected to be driven by the rotatable member;
   inlet passage means communicating pressurized fluid from said first chamber to said second chamber;
   outlet passage means communicating a relatively low pressure fluid source with said second chamber radially inwardly of said inlet passage means relative to said axis;
   said rotatable second chamber imposing a tangential velocity on said pressurized fluid passing therethrough from said inlet passage means to said outlet passage means thereby generating a fluid vortex in said second chamber which impedes fluid flow through said second chamber and produces a corresponding fluid pressure drop in the region of said outlet passage means depending upon the speed of rotation of said second chamber; and
   fluid pressure responsive means operatively connected to said second chamber radially inwardly of said inlet passage means relative to said axis and responsive to the reduced fluid pressure therein.

2. A fluidic velocity sensor as claimed in claim 1 wherein:
   said source of pressurized fluid is maintained at a constant pressure.

3. A fluidic velocity sensor as claimed in claim 1 wherein:
   said second chamber is a circular cavity formed in said rotatable means and provided with axially spaced apart wall portions one of which has a centrally located outlet port communicating with said outlet passage means.

4. A fluidic velocity sensor as claimed in claim 3 wherein:
   said fluid pressure responsive means includes a passage communicating with a port formed in the other of said spaced apart wall portions and aligned with said outlet port.

5. A fluidic velocity sensor as claimed in claim 4 wherein:
said passage is connected to supply fluid from a pressurized source to said port formed in the other of said spaced apart wall portions; and
said fluid pressure responsive means is responsive to the fluid flow through said passage.

6. A fluidic velocity sensor as claimed in claim 3 wherein:
said spaced apart wall portions are connected by an annular wall portion concentric therewith;
said inlet passage means is defined by a plurality of circumferentially spaced apart passages formed in said annular wall portion and extending radially therethrough between said first and second chambers.

7. A fluidic velocity sensor as claimed in claim 1 wherein:
said rotatable means is provided with an end portion having a radially extending wall portion and an annular wall portion concentric therewith and extending therefrom;
said first chamber is defined by spaced apart fixed wall portions and a fixed connecting wall portion therebetween;
said annular wall portion extending into substantially sliding engagement with one of said fixed spaced apart wall portions and together with said one fixed wall portion and said radially extending wall portion defining said second chamber.

8. A fluidic velocity sensor as claimed in claim 1 wherein:
said rotatable means is a shaft mounted for rotation in said casing means and provided with an enlarged diameter portion;
said second chamber is formed in said enlarged diameter portion.

9. A fluidic velocity sensor as claimed in claim 1 wherein:
said relatively low pressure fluid source is the atmosphere.

10. A fluidic velocity sensor as claimed in claim 7 wherein:
said fluid pressure responsive means includes a passage communicating with a restricted port formed in said one of said fixed spaced apart wall portions and aligned with said outlet port.

References Cited

UNITED STATES PATENTS

| | | | |
|---|---|---|---|
| 3,276,259 | 10/1966 | Bowles | 73—505 XR |
| 3,342,196 | 9/1967 | Przybylko | 137—36 |

JAMES J. GILL, Primary Examiner

U.S. Cl. X.R.

137—36